Patented Mar. 2, 1937

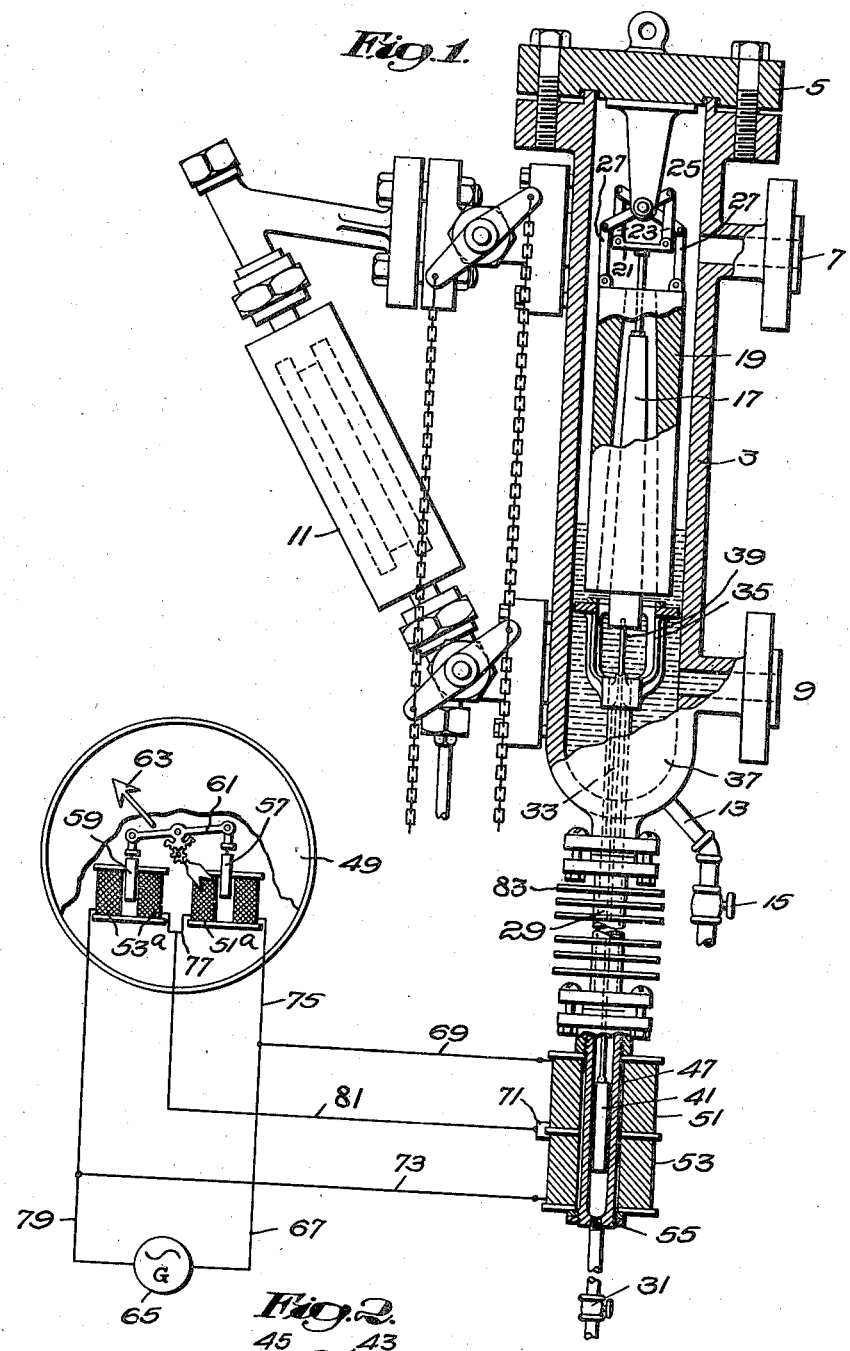

2,072,223

UNITED STATES PATENT OFFICE 2,072,223

LIQUID LEVEL INDICATOR

Robert C. Scott, Cambridge, Mass.

Application October 15, 1931, Serial No. 569,010

3 Claims. (Cl. 177—351)

This invention relates to liquid level indicators adapted primarily for use on high pressure boilers, and coordinate objects are to provide an efficient mechanism whereby, by suitable electrical transmission means the level may be indicated or otherwise suitably made known at an exterior point and also to provide an improved device responsive to the fluctuations of level and one which may advantageously form a cooperative part of such a mechanism in an exemplary and specifically advantageous embodiment.

My invention will be well understood by reference to the following description of the specific embodiment thereof shown by way of example in the accompanying drawing, wherein:—

Fig. 1 is a view partly in side elevation and partly in section of a water column and associated parts with parts broken away and electrical mechanism diagrammatically shown; and Fig. 2 is a section through a preferred form of core utilized in the construction.

Referring to the drawing, I have there shown a so-called water column 3 of known form, herein consisting of a cast steel receptacle closed by the cap 5 at the top and having steam and water inlets 9 adapted to be attached to the boiler in the usual manner. I have herein shown as associated with the column an inclined gage glass 11 of a type commonly used therewith and embodying the principles of the patent to Lank 1,307,892, June 24, 1919, but the presence or absence of such a glass is not material and it forms no part of my present invention. At the bottom of the column there is provided a blow-off pipe 13 controlled by valve 15. All that has just been described is well known in itself.

I provide within the water column 3 mechanism moving responsively to variations of the level of the water therein, the movement of which is indicated exteriorly of the column by suitable means, preferably of the kind hereinafter described. In the preferred form illustrated, this mechanism embodies cooperating displacement members 17 and 19 preferably in the form of solid masses of non-corroding material normally partly submerged in the water and mutually counterpoising one another. Herein member 17 is centrally disposed and surrounded by 19 which is of annular form and the central member is attached to a cross-bar 21 suspended by links 23 to the ends of levers 25 pivoted on bearings carried by the cap 5, the opposite ends of the levers being connected by links 27 to the exterior member 19, these providing a symmetrical suspension for the latter. The members thus mutually counterpoised and centered in the column "float" in the water and their buoyancies act in opposite direction to produce a differential resultant movement when the water level changes. As the height of water in the column increases, each of the bodies will be given an upward force equal to the weight of water it displaces. Since the outer annular member 19 has a greater effective volume than the inner member 17, the upward force on the outer section will be greater than the upward force on the inner section so that the outer section will move upward and the inner section downward until the upward forces upon both sections are equal and the weight of water displaced by both sections is equal. It will be noted that the amount of motion is the same irrespective of the specific gravity of the water or other liquid which might be in question. The resultant motion is preferably in reduced ratio to the variation in the height of the water, and by varying the cross section of one or both of the parts 17 or 19 as indicated in the drawing, the proportion may be changed as desired and may vary within the range of the mechanism.

The mechanism just described constitutes an example of a counterpoised displacement means particularly advantageous for use with electric signalling mechanism such as I am about to describe.

Herein the column 3 is provided with an extension 29 preferably taking the form as shown of a depending coaxial leg. This leg forms a dead end which, however, may be provided with a drain tap 31. The upper end may extend into the column as indicated at 33 and carry a support 35 on which the outer member 19 may rest in its lowermost position. Such an extension 33 also defines a trap-like space 37 in which sediment may settle to be withdrawn through pipe 13 and it will not pass to the interior of the depending leg 29.

The member 17 in the arrangement described is centered directly over the leg. Directly suspended within the leg 29 from the member 17, as by means of a corrosion-resisting rod or chain 39, is a member 41, which I will refer to as a core and which consists essentially of a body of material of high magnetic permeability. Preferably it may be constructed as shown in Fig. 2 of laminations 43 of soft iron tightly enclosed within a protective casing of corrosion-resisting, high resistance material, such as nickel-chromium alloy. The core 41 in its movement responsive to the movement of the "float" mechanism operates within a casing 47 of high resistance material forming a part or extension of the depending leg 29.

The movement of the core 41 within the casing 47 is manifested exteriorly at any suitable remote point by means of a suitable instrument 49, herein shown as of the indicating type, by electromagnetic means preferably of the impedance bridge type, a preferred form of which I will now describe. Surrounding the casing 47 I provide suitable coils 51 and 53 made of insulated wire, conveniently wound upon insulating spools held in position about casing 47 by means of the nuts 55. Cooperating with these coils are coils 51a and 53a as a part of instrument 49 with which coils in the embodiment of the invention illustrated cooperate respectively the soft iron cores 57 and 59 connected to the ends of a rocker arm 61, the movements of which may operate a suitable pointer 63 as, for example, by means of the segment and pinion drive shown.

The coils 51 and 53 are connected in series to a suitable source of alternating current 65 by means of the conductors 67, 69, 71 and 73 while the coils 51a and 53a are similarly connected in series by the conductors 67, 75, 77 and 79. The conductors 71 and 77 which connect the pairs of coils respectively are themselves connected by conductor 81. By this arrangement coils 51 and 51a are connected in parallel between 67 and 71 and coils 53 and 53a between 81 and 79. Coils 51 and 53 are preferably so wound that when current is flowing from 69 to 73 the magnetic polarity of the adjacent ends of the coils will be opposite and likewise that of the relatively remote ends, but such construction is not essential. Likewise the coils 51a and 53a are preferably so wound that if current is flowing in 75 to 79, the magnetic polarity of the upper ends will be opposite and likewise that of the lower ends although this direction of magnetic polarity is not of importance in a construction like that illustrated in which the cores 57 and 59 of the two coils are individual and separate and not connected by magnetic material.

In the construction shown when the core 41 moves downward in response to an increase of water in the boiler, the inductance of coil 53 is increased due to a decrease in the magnetic reluctance and consequently the impedance to the flow of current is increased.

Also, the inductance of the coil 51 is decreased due to an increase in the magnetic reluctance and consequently the impedance to the flow of current is decreased. This results in the decrease in current flow through the coils 53 and 51a and an increase in current flow through the coils 51 and 53a. The increase in current flow in coil 51 relative to the current flow in coil 53 will unbalance the magnetic flow between the cores 57 and 59 and their respective coils and move 59 downward until the magnetic forces between core 59 and coil 53a are equal to the magnetic forces between the core 57 and the coil 51a, and this movement of the cores 57 and 59 will operate pointer 63 and thus indicate movement of core 41 and the level of the water in the column 3. A condition of equilibrium is established when the ratio of inductances of the coils 53a and 51a becomes equal to the ratio between the inductances of the coils 51 and 53 and the impedance bridge is thereby rebalanced. Similarly, on any other movement of the core 41 there is a corresponding proportional movement of the cores 57 and 59 so that for an upward movement of the core 41 core 59 will move downward and core 57 upward, and for a downward movement of the core 41 core 59 will move upward and core 57 downward.

It will be noted that the displacement mechanism and the core 41 operated thereby are all completely enclosed and that the electric mechanism is completely exterior to such enclosure with obvious advantages. By the use of counterpoised displacement means, as exemplified by the differential mechanism shown, a direct suspension of the core 41 is permitted. The core thus may be made as large and heavy as necessary since its weight is itself counterpoised and adequate buoyancy may be provided for operating the same. The construction also permits the core to be operated in a dead-ended leg as shown and conveniently with the arrangement described to trap out sediment in the space 37. The electric transmitting mechanism comprising the coils 51 and 53 may thus be positioned at a suitable distance from the water column so that it is not exposed to deleterious temperatures, say 60° C. or more. To further aid in dissipating heat and to minimize the spacing between the electric mechanism and the water column, the leg 29 between casing 47 and the water column 3 may be provided with heat-dissipating fins 83. When a differential displacement mechanism as herein described is used, the movement of core 41 may be within a suitable range independent of the axially greater range of fluctuation of water level in the column 3.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. A water level indicating device comprising a water column for connection with a boiler or the like, wherein the water level is subject to a considerable range of fluctuation, having a leg depending from the bottom thereof to provide a dead end, a displacement member received in said column to operate in line with said leg, counteracting displacement means cooperating with said member to produce in said member a resultant differential movement proportional in reduced ratio to changes of liquid level in the column, a core of magnetizable material in said depending leg, connected to said displacement members to be moved at the reduced ratio, and means including a remote indicator for exhibiting the position of said core, comprising an impedance balance having a pair of coils exterior to the depending leg at the location of the core, whereby the movement of the core is substantially less than that of the water level and is within the effective range of the adjacent coils of the impedance balance.

2. A liquid level indicating device comprising a liquid column for connection with a boiler or the like, wherein the liquid level is subject to a considerable range of fluctuation, having a leg depending from the bottom thereof to provide a dead end, a displacement member received in said column to operate in line with said leg, a core of magnetizable material in said leg, means connecting said displacement member to said core including differential means for producing in said core a resultant movement proportional in reduced ratio to changes of liquid level in said column, and means including a remote indicator for exhibiting the position of said core, comprising an impedance balance having a pair of coils exterior to the depending leg at the location of the core, whereby the movement of the core is substantially less than that of the liquid level and is within the effective range of the adjacent coils of the impedance balance.

3. A liquid level indicating device comprising a liquid column for connection with a boiler or the like, wherein the liquid level is subject to a considerable range of fluctuations, having a leg depending from the bottom thereof to provide a dead end, a displacement member received in said column to operate in line with said leg, counteracting displacement means cooperating with said member to produce in said member a resultant differential movement proportional in reduced ratio to changes of liquid level in the column, the proportionality varying for increment changes of liquid level in the column, a core of magnetizable material in said depending leg, connected to said displacement members to be moved at the reduced ratio, and means including a remote indicator for exhibiting the position of said core, comprising an impedance balance having a pair of coils exterior to the depending leg at the location of the core, whereby the movement of the core is substantially less than that of the liquid level and is within the effective range of the adjacent coils of the impedance balance.

ROBERT C. SCOTT.